(12) United States Patent
Barry

(10) Patent No.: US 8,135,770 B2
(45) Date of Patent: Mar. 13, 2012

(54) PROCESSING RECURRING EVENTS WITHIN PERSONAL INFORMATION MANAGEMENT CLIENTS

(75) Inventor: Nathan R. Barry, Portsmouth, NH (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 12/344,692

(22) Filed: Dec. 29, 2008

(65) Prior Publication Data

US 2010/0169451 A1 Jul. 1, 2010

(51) Int. Cl.
G06F 15/16 (2006.01)

(52) U.S. Cl. .......................... 709/202; 709/205; 709/246

(58) Field of Classification Search .................. 709/206, 709/246
See application file for complete search history.

(56) References Cited

U.S. PATENT DOCUMENTS

| | | | |
|---|---|---|---|
| 6,370,566 B2 * | 4/2002 | Discolo et al. ................ 709/206 |
| 7,779,151 B2 * | 8/2010 | Major et al. .................. 709/236 |
| 7,877,516 B2 * | 1/2011 | Giroux et al. ................. 709/246 |
| 7,996,338 B2 * | 8/2011 | Kamar et al. .................. 706/11 |
| 2004/0255005 A1 * | 12/2004 | Spooner ........................ 709/218 |
| 2007/0101284 A1 * | 5/2007 | Shaw et al. .................... 715/772 |

* cited by examiner

*Primary Examiner* — Douglas Blair
(74) *Attorney, Agent, or Firm* — Cuenot, Forsythe & Kim, LLC

(57) ABSTRACT

A computer-implemented method of processing recurring events within personal information management (PIM) clients can include executing a plug-in component within a PIM client. The method can include receiving, within the PIM client, an event update including a recurring event identifier that is natively understood by the PIM client and supplemental recurrence data not natively understood by the PIM client. The method further can include, responsive to the plug-in component detecting the supplemental recurrence data and a user input executing the event update, the plug-in component can locate a recurring event corresponding to the recurring event identifier. The method can include the plug-in component updating the recurring event according, at least in part, to the supplemental recurrence data, and storing the recurring event within the PIM client.

17 Claims, 4 Drawing Sheets

PROCESSING RECURRING EVENTS WITHIN PERSONAL INFORMATION MANAGEMENT CLIENTS

BACKGROUND

The embodiments of the present invention relate to personal information management (PIM) clients and, more particularly, to processing recurring events within a PIM client. A PIM client can refer to a computer-based system that can coordinate the entry, tracking, and management of personal information for a user. PIM applications can provide functions such as electronic mail, address books, calendaring, instant messaging (IM), project management, and the like. Typically, a PIM application will perform some combination of one or more of these functions. PIM applications support the user in organizing and interacting with his, or her, personal information. Personal information can include appointments, meeting, tasks, social or business contact information, medical information, financial information, or the like, which is related to the user.

An event that has two or more occurrences can be referred to as a recurring event. A recurring event can be defined as a series of independent occurrences of the event or be defined according to a repeat rule specifying a defined pattern of repetition. For example, a task can be performed every Monday, or a meeting can occur on the last day of every month for one year. An identifier can associate each occurrence of the recurring meeting with each other occurrence or, for example, with a "root" event object representing the recurring event as a whole. The identifier can denote that the occurrences of the recurring meeting are not independent calendar events, but rather are related to one another and form the recurring meeting.

A user can invite other users to attend a recurring event through an event invitation. In addition, the user can issue an event update to an existing recurring event, for example, when a meeting time or date for a recurring event must be changed. A user receiving the event update can decide to either accept or decline the request, and send a response to the issuer of the request based upon that decision.

BRIEF SUMMARY OF THE INVENTION

The embodiments disclosed within this specification relate to personal information management (PIM) clients. One embodiment of the present invention can include a computer-implemented method of processing recurring events within a PIM client. The method can include executing a plug-in component within a PIM client and receiving, within the PIM client, an event update including a recurring event identifier that is natively understood by the PIM client and supplemental recurrence data not natively understood by the PIM client. The method further can include, responsive to the plug-in component detecting the supplemental recurrence data and a user input executing the event update, the plug-in component can locate a recurring event corresponding to the recurring event identifier. The method can include the plug-in component updating the recurring event according, at least in part, to the supplemental recurrence data, and storing the recurring event within the PIM client.

Another embodiment of the present invention can include a computer-implemented method of creating recurring events within a PIM client. The method can include executing a plug-in component within a PIM client and receiving, within the PIM client, an event invitation including a first portion that is natively understood by the PIM client and a second portion including supplemental recurrence data not natively understood by the PIM client. Responsive to the plug-in component detecting the supplemental recurrence data and a user input accepting the event invitation, the plug-in component can create a recurring event according to the first portion and the second portion of the event update that includes the supplemental recurrence data. The recurring event can be stored within the PIM client.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
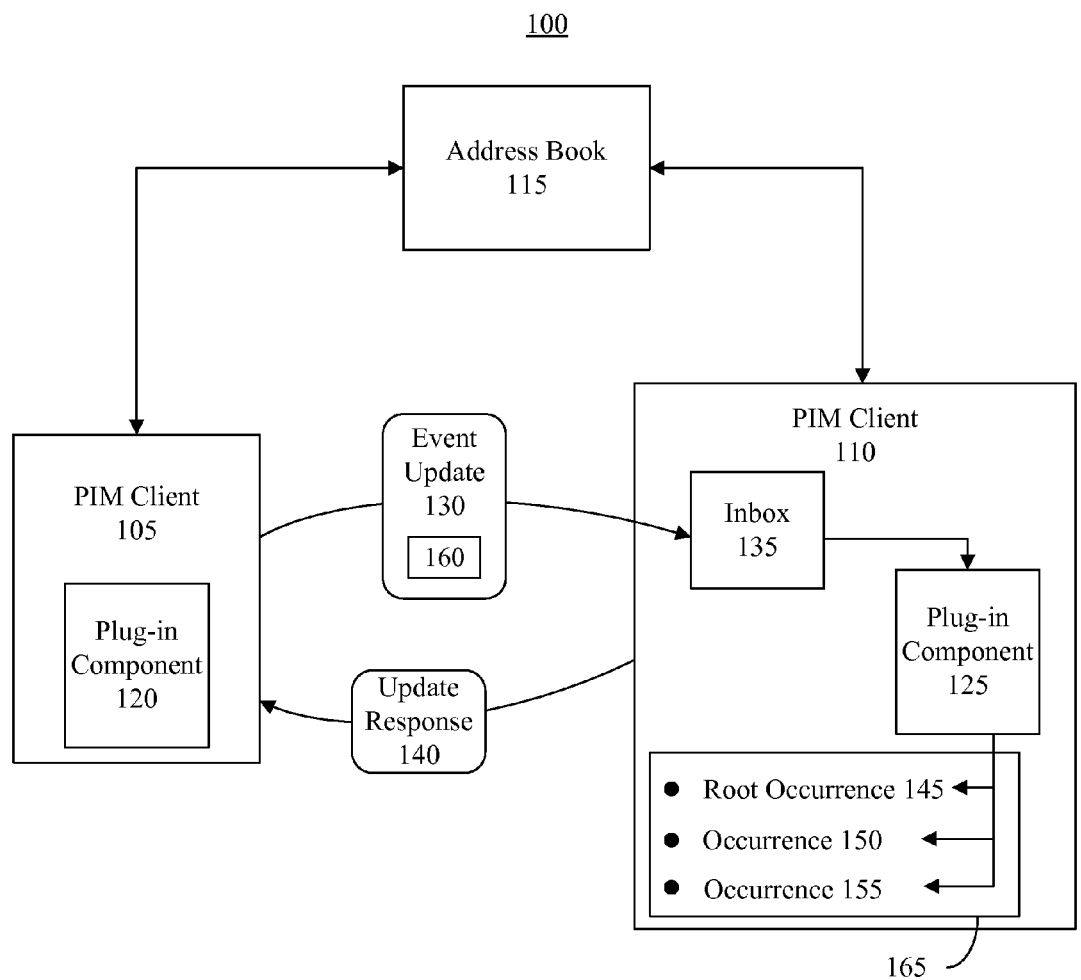
FIG. 1 is a first block diagram illustrating a system for personal information management (PIM) in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification relate to personal information management (PIM). More particularly, the embodiments relate to processing recurring events within a PIM client. A variety of different PIM applications exist. As such, a given PIM client can interact with another PIM client that executes a different PIM application. While each PIM client can provide functionality for processing events and, in particular, recurring events, each PIM client may handle that information differently. These differences can manifest themselves in terms of interoperability issues as the expected event format used by each PIM application can differ. The interoperability issues can be especially problematic when creating and updating recurring events. The format for describing the potentially complex structure of a recurring event often differs from one PIM application to another.

In accordance with the inventive arrangements disclosed herein, a PIM client of a user can receive an event update for a recurring event. The event update can specify or indicate a particular recurring event already scheduled within the PIM client in a format that is natively understood by the PIM client. The event update also can include supplemental information relating to the recurring event that is not natively understood by the receiving PIM client. A plug-in component, executing within the PIM client, can detect and interpret the supplemental information for the PIM client. The plug-in component can update the recurring event indicated by the event update as specified by the supplemental information. Subsequently, the updated recurring event can be stored within the PIM client.

As used within this specification, the terms "native" or "natively," can refer to an inherent method, used by a PIM client, of formatting or interpreting events or event information. For example, data that is natively understood or natively formatted by a PIM client can refer to data that is detectable and understandable by the PIM client without changes to, or translation of, the data.

FIG. 1 is a first block diagram illustrating a system 100 for processing recurring events in accordance with one embodiment of the present invention. System 100 can process event update requests exchanged between PIM clients having incompatible or differing recurring event formats. As used within this specification, the term "event update" or "event update request," can refer to any message received by a PIM client seeking to update, modify, or otherwise interact with a recurring event already scheduled and stored as a recurring event type of calendar object within a calendar maintained by the PIM client. System 100 can include a sending PIM client 105, a receiving PIM client 110, and an address book 115.

PIM clients 105 and 110 each can be implemented as a data processing system suitable for storing and/or executing program code, such as a PIM application. Each of PIM clients 105 and 110 will include at least one processor coupled directly or indirectly to memory elements through a system bus. The memory elements can include local memory employed during actual execution of the program code, e.g., random access memory, bulk storage, e.g., a hard drive or other persistent data storage device, and cache memories which provide temporary storage of at least some program code in order to reduce the number of times code must be retrieved from bulk storage during execution. PIM clients 105 and 110 can be implemented as, for example, desktop computers, mobile computing devices, mobile phones, wireless-enabled personal digital assistants, or other data processing system.

Input/output or I/O devices (including but not limited to keyboards, displays, pointing devices, etc.) can be coupled to each of PIM clients 105 and 110 either directly or through intervening I/O controllers. Network adapters may also be coupled to PIM clients 105 and 110 to enable PIM clients 105 and 110 to become coupled to other data processing systems or remote printers or storage devices through intervening private or public networks. Modems, cable modems, and Ethernet cards are just a few of the currently available types of network adapters.

As noted, each of PIM clients 105 and 110 can execute a PIM application, which is stored in memory of each respective PIM client. PIM clients 105 and 110 further can store event information as calendar objects stored within a calendar corresponding to a user within memory of each respective PIM client 105 and 110. The term, "event," as used within this specification, can refer to any activity, responsibility, action, or the like related to a user that can be associated with a calendar date and stored within a calendar of a PIM client. For example, events can include meetings, tasks, appointments, deadlines, and the like.

PIM clients 105 and 110 can be communicatively linked via a communication network (not shown). As such, PIM clients 105 and 110 can be coupled via a wired or wireless network, whether a short range wireless network or a long range wireless network, e.g., a mobile network. A messaging server (not shown) further can be included between PIM client 105 and PIM client 110 to facilitate messaging between each device.

As shown, system 100 can include an address book 115 stored in a data storage device. Address book 115 can be a list of stored personal information corresponding to contacts associated with a user. Address book 115 can include electronic mail addresses, or other communication addresses, as well as a type of PIM application executed by each user's PIM client. In one embodiment, each PIM client 105 and 110 can include an address book such as address book 115. In another embodiment, the address book 115 can be maintained within a server. In that case, an address book maintained by each of PIM clients 105 and 110 can be updated from, or synchronized with, address book 115.

PIM clients 105 and 110 can include a plug-in component (plug-in) 120 and 125 respectively. Plug-ins 120 and 125 can provide additional capabilities to PIM clients 105 and 110. In one embodiment, plug-ins 120 and 125 can operate continuously within PIM clients 105 and 110. In another embodiment plug-ins 120 and 125 can be invoked on an "as needed" basis responsive to the occurrence or detection of particular conditions, e.g., events. Each of plug-ins 120 and 125 can generate and/or process supplemental recurrence data that is not otherwise detectable by the host PIM client or natively understood by the host PIM client. As used within this specification, the term "supplemental recurrence data," can refer to information corresponding to any aspect of a recurring event which cannot be detected and/or understood by a receiving PIM client without the aid of a plug-in or other type of "add-on" component.

In operation, plug-in 120 can execute within PIM client 105 and plug-in 125 can execute within PIM client 110. A user of PIM client 105 can provide a user input specifying an update to a scheduled or existing recurring event. Responsive to the updating of the recurring event within PIM client 105, an event update message, e.g., event update 130, can be sent to each participant in the recurring event. Accordingly, plug-in 120 can access address book 115. Plug-in 120 can determine a PIM client type for each PIM client of a participant, e.g., PIM client 110.

Using the PIM client type of PIM client 110 and update information for the recurring event, plug-in component 120 can create event update 130, which can be sent to an inbox 135 of PIM client 110. Event update 130 can include a first portion that is natively understood by PIM client 110. That portion of event update 130 can specify, for example, a recurring event identifier that can be used to locate the particular recurring event stored within PIM client 110 that is being updated, e.g., recurring event 165. In one embodiment, for example, the recurring event identifier can be a root occurrence from which other occurrences of the recurring event are based or scheduled. Plug-in 120 further can include supplemental recurrence data 160 within a second portion of event update 130 which is not detectable or understandable by PIM client 110, but which can be detected and understood by plug-in 125.

Consider the case where PIM client 110 must receive updates to a recurring event as a plurality of individual event updates, where each event update relates to one occurrence of the recurring event. Sending a plurality of updates in this manner can be cumbersome for the user, particularly when each update arrives in inbox 135 of PIM client 110 as a separate message that must be individually selected, executed, and accepted by the user of PIM client 110. If PIM client 105 is capable of sending an update that changes multiple occurrences of the recurring event in a single message, that format will not be understood by PIM client 110.

When creating event update 130, PIM client 105 can determined, from address book 115, that PIM client 110 utilizes a different recurring event format. As such, plug-in 120 can be invoked to generate at least a portion of event update 130, e.g., the second portion including supplemental recurrence information 160. Plug-in 120 can specify changes to a plurality of occurrences of a recurring event within the supplemental recurrence data 160.

PIM client 110 can receive event update 130 within inbox 135. The user of PIM client 110 can then select and execute event update 130, which, for example, may appear as a received electronic mail. The particular recurring event to which event update 130 relates can be determined from the recurring event identifier specified within event update 130. As noted, the recurring event identifier can specify, or be, for example, a root occurrence of a recurring event, e.g., root occurrence 145, which may be used as a unique identifier corresponding to recurring event 165.

An additional identifier signifying that event update 130 includes supplemental recurrence data 160 can be included in event update 130. In one embodiment, PIM client 110, while not being able to detect supplemental recurrence data 160, can natively detect that identifier and, in response to execution of event update 130, invoke plug-in 125. In another embodiment, plug-in 125 can be invoked responsive to execution of event update 130 automatically and detect the presence of supplemental recurrence data 160, whether such an identifier is included in event update 130 or not. In any case, without plug-in 125, PIM client 110 would not detect or have any ability to process the supplemental recurrence data 160 that specifies changes to additional occurrences of a recurring meeting, e.g., occurrence 150 and/or occurrence 155.

Responsive to detecting the existence of supplemental recurrence data 160 in the event update 130, plug-in 125 can suppress the presentation of event information from PIM client 110 and present event information generated from plug-in 125. Typically, a PIM client will display a message to the user indicate the type of changes to be made to the recurring event. As the supplemental recurrence data 160 within event update 130 is not natively understood by PIM client 110, a message generated by PIM client 110 would be inaccurate as any changes to be made to recurring event 165 that are specified in supplemental recurrence data 160 would not be included in the message. By suppressing the display of a message from PIM client 110, plug-in 125 can, in lieu of that message, display a message that includes notification information describing changes to be made to recurring event 165, inclusive of those specified by the supplemental recurrence data 160.

For example, PIM client 105 can send an event update specifying, within the natively understood portion of the event update, a change to one particular occurrence of the recurring event, e.g., root occurrence 145. Plug-in 120 can place supplemental recurrence data describing changes to occurrences 150 and 155 of the same recurring event within supplemental recurrence data 160, which, as noted, can be placed in unused fields of the event update 130.

Upon event update 130 being opened, typically, PIM client 110 would display a message indicating that only root occurrence 145 of recurring event 165 is being updated since the supplemental recurrence data 160 is not natively understood or detected. Plug-in 125, however, which can process the supplemental recurrence data 160 can suppress the presentation of that information from PIM client 110 and, in place of the information from PIM client 110, present update information indicating that occurrence 145, 150, and 155 will be updated in consequence of executing event update 130. The functionality provided by plug-in 125 alleviates the need for PIM client 105 to send one event update for each of occurrences 145, 150, and 155. That would require that the user execute each event update individually. One can see that as the number of occurrences of a recurring meeting grows, the burden placed on the user would also grow.

Continuing, having presented the update information within event update 130 to the user, plug-in 125 can execute event update 130 responsive to a user input to PIM client 110, e.g., an acceptance. As noted, a recurring event identifier within event update 130 can be used to determine which recurring event, e.g., recurring event 165, is to be updated by event update 130.

Plug-in 125 can execute event update 130, updating the recurring event 165, stored within PIM client 110, which corresponds to event update 130. In particular, plug-in 125 can locate those occurrences, e.g., occurrence 150 and 155, of the relevant recurring event 165 that require updating according to the supplemental recurrence data 160 and make the changes as may be required. The first portion of update event 130, specified in the native format of PIM client 110, also may indicate changes to one occurrence of recurring meeting 165, e.g., root occurrence 145. The first portion of event update 130 can be processed by PIM client 110 natively or can be processed by plug-in 125. In one embodiment, the event update can be a single event update.

Plug-in 125 can begin by identifying the recurring event 165 within PIM client 110 corresponding to event update 130. As the natively understood portion of event update 130 can specify an event update for an occurrence of recurring meeting 165, plug-in 125 can locate and update the appropriate occurrence, e.g., root occurrence 145 in this example. Plug-in 125 can iteratively locate and update the occurrences 150 and 155 of recurring event 165 as specified by the supplemental recurrence data 160. Responsive to determining occurrence 155 is the last occurrence of the recurring event, the updated recurring event can be stored within PIM client 110.

Further, after execution of event update 130, plug-in 125 can suppress an update response to event update 130 that may be generated by PIM client 110. Typically, PIM 110 an update response to PIM client 110 specifying update information confirming that the specified changes to recurring event 165 were made. In the same way that any confirmatory messages from PIM client 110 to the user will be inaccurate, so too will any update responses as only information that is natively understood by PIM client 110 would be included in the response. Such a response would neglect changes specified in the supplemental recurrence data 160. Accordingly, plug-in 125 can suppress any response from PIM client 110 and generate an update response 140, including update information for the supplemental recurrence data 160, which then can be sent to PIM client 105.

It should be noted that the same principles and techniques used to execute an event update can be applied to an event invitation or a request to create a recurring event. In that case, supplemental recurrence data can be used to create calendar events for each additional occurrence of the event within the calendar. The processing of event invitations will be more fully described with reference to FIG. 5 within this specification.

Figure 2:
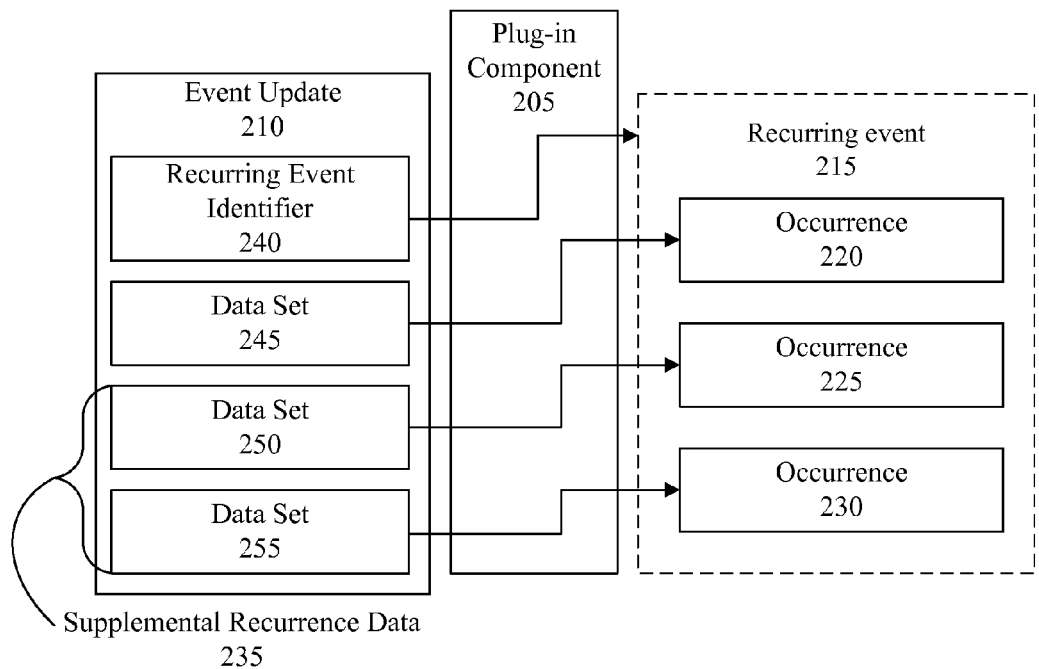
FIG. 2 is a second block diagram illustrating a system for processing recurring event updates within PIM clients in accordance with another embodiment of the present invention.

FIG. 2 is a second block diagram illustrating a system 200 for processing recurring event updates within PIM clients in accordance with another embodiment of the present invention. System 200 illustrates a case where a receiving PIM client is capable of receiving update events that specify change information for only one occurrence of the recurring event. Further, the PIM client can represent recurring events, e.g., recurring event 215, in the form of separate recurring event instances, where each of occurrences 220, 225, and 230 are specified as separate instances of an event. In this example, the receiving PIM client can execute a plug-in 205.

Referring to FIG. 2, plug-in 205 can receive event update 210. Responsive to a user input executing event update 210, plug-in 205 can determine, from recurring event identifier 240, that event update 210 is for recurring event 215. Recurring event 215 will have been previously scheduled within the receiving PIM client. Plug-in 205 can identify data set 245 specified in the natively understood format of the receiving PIM client. Plug-in 205 can process data set 245 and update the appropriate occurrence of recurring event 215, e.g., occurrence 220. For example, data set 245 may be for a root occurrence of the recurring event. As another example, the combination of recurring event identifier 240 and data set 245 can specify a single event update of the variety natively understood by the receiving PIM client. That is, event update 210 will appear to the receiving PIM client as an update to a single occurrence of a recurring event.

Event update 210 includes supplemental recurrence data 235, which includes data sets 250 and 255. Plug-in 205 can detect the presence of supplemental recurrence data 235 and begin processing data set 250 and data set 255. Plug-in 205 can process data set 250 and determine that data set 250 specifies a change to occurrence 225. Accordingly, plug-in 205 can update occurrence 225 as specified by data set 250. Similarly, plug-in 205 can process data set 255 and determine that data set 255 specifies changes for occurrence 230. Accordingly, plug-in 205 can update occurrence 230 as specified by data set 255.

For example, event update 210 can be an event update for a recurring meeting 215 on Monday, Wednesday, and Friday. The Monday meeting can be occurrence 220, which can be updated from data set 245. Plug-in 205 then can begin processing the update information contained within supplemental recurrence data 235. Plug-in 205 can iteratively locate occurrences 225 and 230 to be updated with update information contained within supplemental recurrence data 235. Occurrence 225, which can correspond to the Wednesday meeting, can be updated according to update information contained within data set 250. Occurrence 230, which can correspond to the Friday meeting, can be updated according to update information contained in data set 255.

Subsequent to the updating of occurrence 230, plug-in 205 can determine that data set 255 is the last data set contained within the supplemental recurrence data 235. With the last data set within the supplemental recurrence data 235 being processed, updated recurring event 215 can be stored within the receiving PIM client. It should be appreciated that while the example of FIG. 3 illustrated changing existing occurrences of a recurring meeting, the supplemental recurrence data 235 can specify that one or more occurrences are to be created, one or more existing occurrences are to be deleted, or that one or more occurrences are to be modified.

Figure 3:
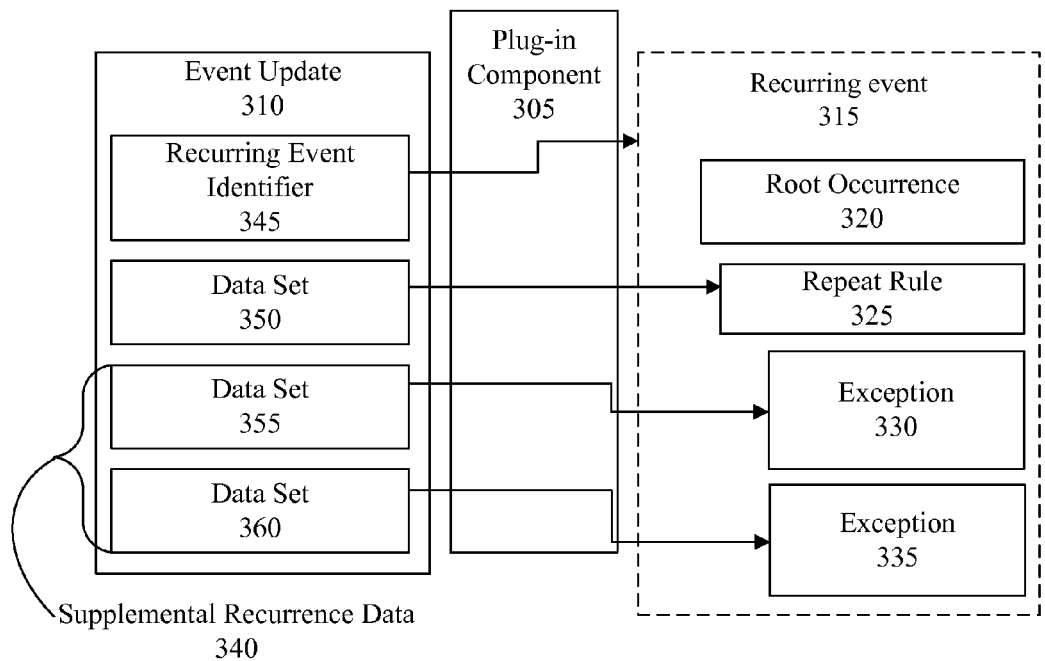
FIG. 3 is a third block diagram illustrating a system for processing recurring event updates within PIM clients in accordance with another embodiment of the present invention.

FIG. 3 is a third block diagram illustrating a system 300 for processing recurring event updates within PIM clients in accordance with another embodiment of the present invention. Though described with reference to recurring event updates, the embodiments described with reference to FIG. 3, as noted, also can be applied to the case where a recurring event is created using supplemental recurrence data and the plug-in architecture as described.

System 300 illustrates a case where a receiving PIM client is capable of receiving update events that specify change information for only one occurrence of the recurring event. Further, the PIM client can represent recurring events, e.g., recurring event 315, in the form of a root occurrence 320 coupled, or associated with a repeat rule 325. One or more exceptions to repeat rule 325 may be specified. In this example, the receiving PIM client can execute a plug-in 305.

Referring to FIG. 3, plug-in 305 can receive event update 310. As the receiving PIM client natively understands a recurring event, e.g., recurring event 315, as a root occurrence 320 coupled with a repeat rule 325, event update 310 can be formatted in like manner. Event update 310 can include a recurrence event identifier 345 that can reference either recurring event 315 and/or root occurrence 320. Event update 310 further can include a data set 350 that can specify an update to repeat rule 235. Recurrence event identifier 345 and data set 350 can form the natively understood portion of event update 310. In one embodiment, data set 350 can specify an exception, to be described herein in greater detail.

Event update 310 also can include supplemental recurrence data 340. Supplemental recurrence data 340 can include a data set 355 and a data set 360. Responsive to a user input requesting execution of event update 310, plug-in 305 can use recurring event identifier 345 to identify recurring event 315 as the recurring event, within the receiving PIM client, corresponding to event update 310. Plug-in 305 then can locate root occurrence 320 and repeat rule 325. Plug-in 305 can process data sets 355 and 360, which are not natively understood by the receiving PIM client, to update or generate exceptions 330 and 335 respectively.

For example, event update 310 can be an update for a recurring meeting occurring every Monday for 3 weeks that adds a Tuesday meeting in the fourth week and changes the time of each Monday meeting. The initial Monday meeting can be the root occurrence 320 for recurring event 315. Repeat rule 325 can define the recurrence of the event as being repeated weekly and occurring for 3 weeks.

In executing event update 310, plug-in 305 can locate root occurrence 320 and repeat rule 325 within the receiving PIM client. The time change for the Monday meetings can be specified within data set 350. Accordingly, plug-in 305 can update the repeat rule 325 of recurring event 315, thereby changing the time of each occurrence of recurring event on Monday as specified. Plug-in 305 can process data set 355, for example, which can add the occurrence of the Tuesday meeting. Plug-in 305 can, for instance, append an exception such as exception 330 to the repeat rule 325, which can define the added Tuesday meeting.

As was the case with respect to FIG. 2, FIG. 3 the supplemental recurrence data 340 can specify the deletion of an occurrence of a recurring event, the addition of an occurrence of a recurring event, or the modification of an occurrence of a recurring event. These changes to the recurring event can be specified through the modification of the repeat rule, the modification to an exception, the deletion of an exception, or the addition of an exception. Such actions can be taken responsive to interpreting the supplemental recurrence data.

Figure 4:
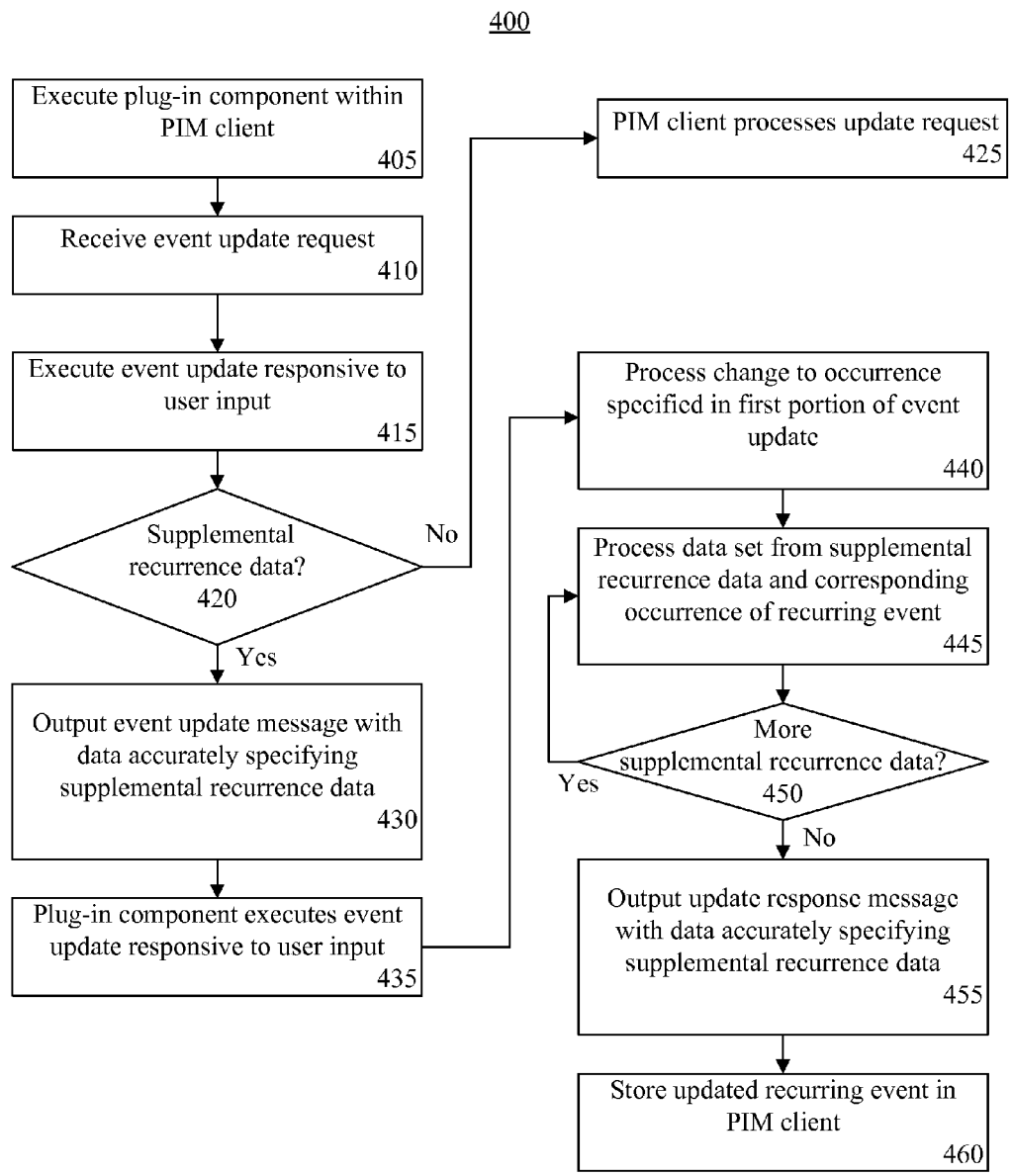
FIG. 4 is a first flow chart illustrating a method of processing event updates within a PIM client in accordance with another embodiment of the present invention.

FIG. 4 is a first flow chart illustrating a method of processing event updates within a PIM client in accordance with another embodiment of the present invention. The method 400 can be implemented using a system as described with reference to FIGS. 1-3.

Accordingly, in step 405, a plug-in can begin executing within a PIM client. The plug-in component can monitor for the arrival of event updates within the PIM client, monitor for the opening of an event update, or be invoked by the PIM client in response to opening an event update having a particular identifier. In step 410, an event update can be received by the PIM client. The event update can be received from a PIM client initiating the event update. The PIM client initiating the event update can format the event update as a single update event that is natively understandable by the PIM client receiving the update. The event update, however, further can include supplemental recurrence data describing additional changes to the recurring event. As noted, the sending PIM client, which also can include a plug-in, can include such supplemental recurrence data after determining the type of PIM application executed by the receiving PIM client.

In step 415, responsive to a user input, the event update can be executed responsive to a user input, e.g., the user double-clicking on the event update from his or her inbox. In decision box 420, the plug-in can determine whether supplemental recurrence data exists within the event update. When supplemental recurrence data exists within the event update, the method 400 can proceed to step 430. When supplemental recurrence data does not exist within the event update, the method 400 can proceed to step 425 and the PIM client can process the event update as would be done in a conventional system, e.g., for a single event update specifying a modification to one occurrence of a recurring event.

The lack of supplemental recurrence data within the event update signifies that all of the content of the event update is natively understood by the PIM client. As all the content of the event update is natively understood by the PIM client, no processing is required by the plug-in to update the recurring event corresponding to the event update. Accordingly, all processing of the event update can be performed by the PIM client.

In step 430, an event update message can be output that includes data that accurately specifies the supplemental recurrence data. In one embodiment, the plug-in can suppress the display of a message including event update information from the PIM client, e.g., the event update message. In lieu of that message, the plug-in can generate an event update message and output the event update message to the user. As used herein, "output" or "outputting" can include, but is not limited to, storing data in memory, e.g., writing to a file, writing to a user display or other output device, e.g., playing audible notifications, sending or transmitting to another system, exporting, or the like. The plug-in component can determine each occurrence of the recurring event to be changed, as specified by the native portion of the event update and the supplemental recurrence data, and notify the user as to the particular changes that will be made to the recurring event.

In another embodiment, the plug-in can allow the PIM client to generate and output the event update message. The plug-in can modify the results of the event update message, as output from the PIM client, to accurately reflect processing performed by the plug-in as specified by the supplemental recurrence data. That is, the plug-in can modify the explanatory text or results of the event update message per the supplemental recurrence data.

In step 435, responsive to a user input, the plug-in can execute the event update. In step 440, the plug-in can update any occurrence of the recurring event that is natively specified by the event update, e.g., specified by the first portion of the event update. In step 445, the plug-in can process a selected data set of the supplemental recurrence data and make any changes to the recurring event as specified. For example, an occurrence indicated by the selected data set can be added, deleted, or modified. In decision box 450, the plug-in can determine whether any further data sets of supplemental recurrence data remain to be processed. If so, the method 400 can loop back to step 445 to process a further data set of the supplemental recurrence data. If not, the method 400 can continue to step 455.

When all occurrences have been updated, the method 400 can proceed to step 455, where an update response message can be output. The update response message can include, or specify, data that accurately reflects the supplemental recurrence data. In one embodiment, the plug-in can suppress a response to the event update generated by the PIM client and generate a response to the event update. The response to the event update can indicate or confirm all changes made to the recurring event. The response, for example, can be forwarded or sent to the PIM client that initially sent the event update as a confirmation.

In another embodiment, the plug-in can allow the PIM client to generate and output the update response message. The plug-in can modify the results of the update response message, as output from the PIM client, to accurately reflect processing performed by the plug-in as specified by the supplemental recurrence data. That is, the plug-in can modify the explanatory text or results of the update response message per the supplemental recurrence data.

In step 460, the updated recurring event can be stored within the PIM client, e.g., output.

Figure 5:
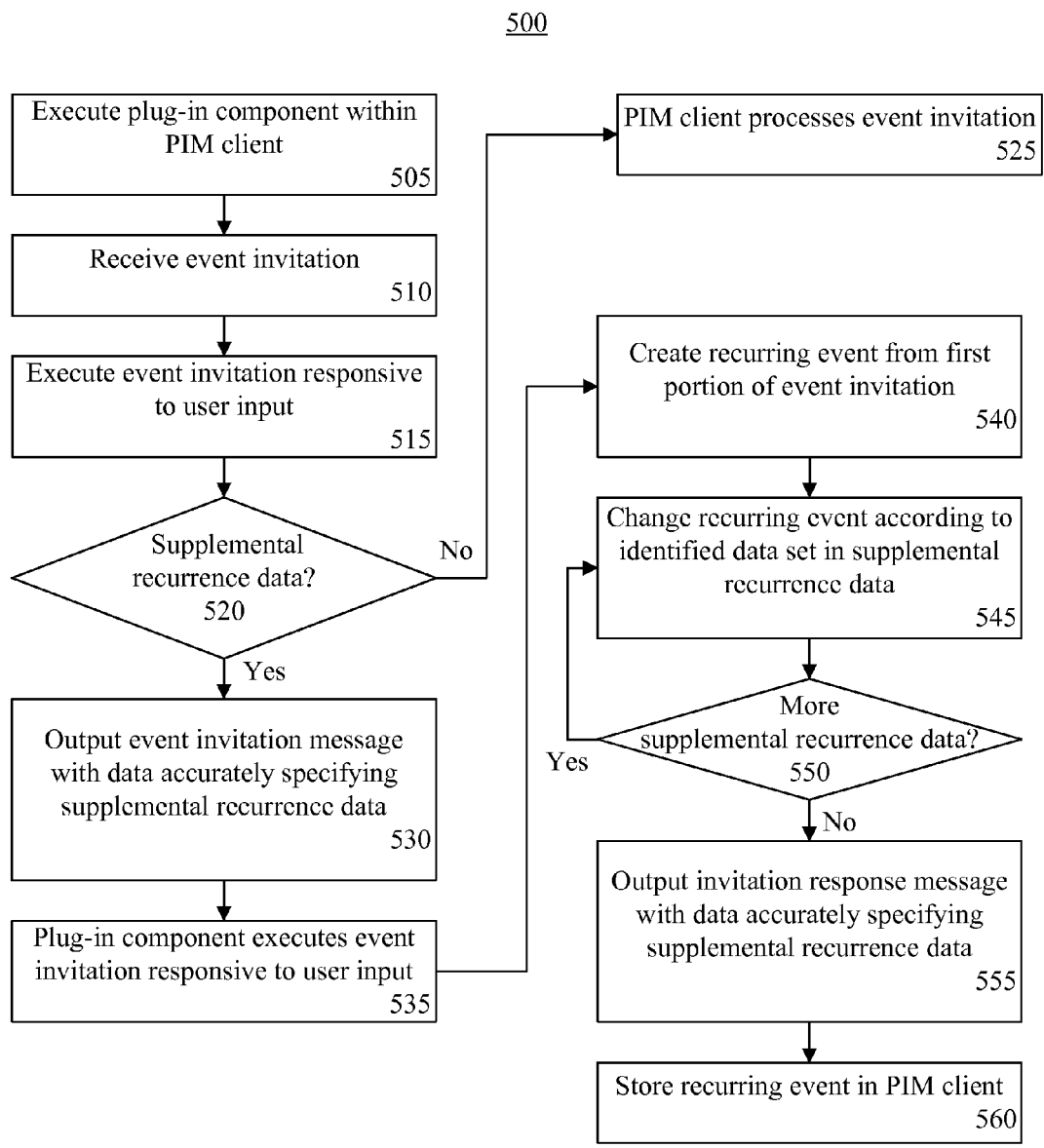
FIG. 5 is a second flow chart illustrating a method of processing event invitations within a PIM client in accordance with another embodiment of the present invention.

FIG. 5 is a second flow chart illustrating a method 500 of processing an event invitation within a PIM client in accordance with another embodiment of the present invention. The methods used to update recurring events within a PIM client, as described within this specification, can be applied to creating a recurring event from an event invitation exchanged between two or more PIM clients, each using a differing recurring event format. The method 500 can be implemented using a system such as described with reference to FIG. 1 or any other system with the same or similar functionality.

In step 505, a plug-in can begin executing within a PIM client. In step 510, an event invitation can be received within the PIM client. The event invitation can be received from a PIM client initiating the event that has a plug-in as described. The PIM client initiating the event can format the event invitation as a single update event specifying natively understandable information. The event invitation, further, can include supplemental recurrence data describing additional occurrences of the recurring event not described within the root event as well as any additional information required to create the recurring event.

In step 515, responsive to a user input, e.g., the user double clicking on the event invitation from within his or her inbox, the event invitation can be executed. In decision box 520, the plug-in can determine whether supplemental recurrence data exists within the event invitation. When supplemental recurrence data exists within the event invitation, the method 500 can proceed to step 530. When supplemental recurrence data does not exist within the event invitation, the method 500 can proceed to step 525 and the PIM client can process the event invitation, e.g., as an invitation for a single event as opposed to a recurring event.

In step 530, an event invitation message can be output that includes data that accurately specifies the supplemental recurrence data. In one embodiment, the plug-in can suppress the event invitation message generated from the PIM client. The plug-in can generate an event invitation message and output that message to the user for the recurring event, inclusive of information describing each occurrence to be created as specified by the supplemental recurrence data. In another embodiment, the plug-in can allow the PIM client to generate and output the event invitation message. The plug-in can modify the results of the event invitation message, as output from the PIM client, to accurately reflect processing performed by the plug-in as specified by the supplemental recurrence data. That is, the plug-in can modify the explanatory text or results of the event invitation message per the supplemental recurrence data.

In step 535, responsive to a user input accepting the recurring event as described in the notification generated by the plug-in, the plug-in can begin processing the event invitation.

In step 540, a recurring meeting can be created based upon the portion of the event invitation that is natively understood by the receiving PIM client, e.g., the first portion of the event invitation. It should be noted that the recurring event generated will not accurately describe all occurrences of the recurring event until such time that the supplemental recurrence data is processed. In step 545, the plug-in can select a data set from the supplemental recurrence data and add an occurrence of the event as specified by the data set. In one embodiment, a separate instance can be created to represent each occurrence of the recurring event. In another embodiment, a repeat rule can be created or an exception to the repeat rule can be created according to the data set. In either case, additional occurrences of the recurring meeting can be added as specified by the data set of the supplemental recurrence data being processed within the receiving PIM client in the appropriate format.

In decision box 550, the plug-in can determine whether additional supplemental recurrence data exists to be processed, e.g., further data sets. If so, the method 500 can loop back to step 545 to select the next data set of the supplemental recurrence data and continue processing. If not, the method 500 can proceed to step 555. In step 555, where an invitation response message can be output. The invitation response message can include, or specify, data that accurately reflects the supplemental recurrence data. In one embodiment, the plug-in can suppress the invitation response message generated by the PIM client. The plug-in can generate and output the invitation response message for the recurring event. That invitation response message can be sent to the PIM client that originally sent the event invitation.

In another embodiment, the plug-in can allow the PIM client to generate and output the invitation response message. The plug-in can modify the results of the invitation response message, as output from the PIM client, to accurately reflect processing performed by the plug-in as specified by the supplemental recurrence data. That is, the plug-in can modify the explanatory text or results of the invitation response message per the supplemental recurrence data.

In step 560, the recurring event can be stored within the PIM client.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flowchart(s) and block diagram(s) in the figures illustrate the architecture, functionality, and operation of possible implementations of systems, methods, and computer program products according to various embodiments of the present invention. In this regard, each block in the flowchart (s) or block diagram(s) may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

The invention claimed is:

1. A computer-implemented method of processing recurring events within a personal information management (PIM) client, the method comprising:
   executing a plug-in component within a PIM client;
   receiving, within the PIM client, an event update comprising a recurring event identifier natively understood by the PIM client and supplemental recurrence data not natively understood by the PIM client;
   responsive to the plug-in component detecting the supplemental recurrence data and a user input executing the event update, the plug-in component locating a recurring event corresponding to the recurring event identifier;
   the plug-in component updating the recurring event according, at least in part, to the supplemental recurrence data;
   storing the recurring event within the PIM client; and
   generating, within a different PIM client, the event update to include a first portion comprising event data that is natively understandable by the PIM client and a second portion comprising the supplemental recurrence data that is only understood by the plug-in within the PIM client.

2. The computer-implemented method of claim 1, wherein the PIM client stores a recurring event by representing each occurrence of the recurring event as an instance, wherein the plug-in component updating the recurring event according, at least in part, to the supplemental recurrence data further comprises iteratively updating selected instances for the recurring meeting according to the supplemental recurrence data within the event update.

3. The computer-implemented method of claim 1, wherein the PIM client stores a recurring event as an occurrence of the event coupled with a repeat rule, wherein the plug-in component updating the recurring event according, at least in part, to the supplemental recurrence data further comprises creating a plurality of exceptions to the repeat rule according to the supplemental recurrence data within the event update.

4. The computer-implemented method of claim 1, further comprising outputting an event update message comprising information indicating which occurrences of the recurring event are to be updated according to the supplemental recurrence data.

5. The computer-implemented method of claim 1, further comprising outputting an update response message comprising information confirming which occurrences of the recurring event have been updated in the PIM client according to the supplemental recurrence data.

6. The computer-implemented method of claim 1, further comprising the plug-in detecting an identifier within the event update indicating that supplemental recurrence data exists.

7. A computer-implemented method of creating recurring events within a personal information management (PIM) client, the method comprising:
   executing a plug-in component within a PIM client;
   receiving, within the PIM client, an event invitation comprising a first portion that is natively understood by the PIM client and a second portion comprising supplemental recurrence data not natively understood by the PIM client;

responsive to the plug-in component detecting the supplemental recurrence data and a user input accepting the event invitation, the plug-in component creating a recurring event according to the first portion and the second portion of the event update comprising the supplemental recurrence data;

storing the recurring event within the PIM client; and generating, within a different PIM client, the event invitation to include a first portion comprising natively understood event data understandable by the PIM client and a second portion comprising the supplemental recurrence data that is only understood by the plug-in within the PIM client.

8. The computer-implemented method of claim 7, wherein the PIM client stores a recurring event by representing each occurrence of the recurring event as an instance, wherein the plug-in component creating a recurring event according, at least in part, to the first portion and the second portion of the event update comprising the supplemental recurrence data comprises iteratively adding a plurality of instances specifying the recurring event according to the supplemental recurrence data within the event invitation.

9. The computer-implemented method of claim 7, wherein the PIM client stores a recurring event as an occurrence of the event coupled with a repeat rule, wherein the plug-in component creating a recurring event according, at least in part, to the first portion and the second portion of the event update comprising the supplemental recurrence data comprises creating a repeat rule specifying a plurality of occurrences for the recurring event according to the supplemental recurrence data within the event invitation.

10. The computer-implemented method of claim 7, further comprising outputting an event invitation message comprising information indicating which occurrences of the recurring event are to be created according to the supplemental recurrence data.

11. The computer-implemented method of claim 7, further comprising outputting an invitation response message comprising information confirming which occurrences of the recurring event have been created in the PIM client according to the supplemental recurrence data.

12. The computer-implemented method of claim 7, further comprising the plug-in detecting an identifier within the event invitation indicating that supplemental recurrence data exists.

13. A computer program product comprising:

a computer-readable storage comprising computer-usable program code stored thereon that processes recurring events within a personal information management (PIM) client, the computer-readable storage comprising:

computer-usable program code that executes a plug-in component within a PIM client;

computer-usable program code that receives, within the PIM client, an event update comprising a recurring event identifier natively understood by the PIM client and supplemental recurrence data not natively understood by the PIM client;

computer-usable program code corresponding to the plug-in component that, responsive to detecting the supplemental recurrence data and a user input executing the event update, locates a recurring event corresponding to the recurring event identifier;

computer-usable program code corresponding to the plug-in component that updates the recurring event according, at least in part, to the supplemental recurrence data;

computer-usable program code that stores the recurring event within the PIM client; and computer-usable program code that generates, within a different PIM client, the event update to include a first portion comprising natively understood event data understandable by the PIM client and a second portion comprising the supplemental recurrence data that is only understood by the plug-in within the PIM client.

14. The computer program product of claim 13, wherein the PIM client stores a recurring event by representing each occurrence of the recurring event as an instance, wherein the computer-usable program code corresponding to the plug-in component that updates the recurring event according, at least in part, to the supplemental recurrence data further comprises computer-usable program code that iteratively updates each of a plurality of instances for the recurring meeting according to the supplemental recurrence data within the event update.

15. The computer program product of claim 13, wherein the PIM client stores a recurring event as an occurrence of the event coupled with a repeat rule, wherein the computer-usable program code corresponding to the plug-in component that updates the recurring event according, at least in part, to the supplemental recurrence data further comprises computer-usable program code that creates a plurality of exceptions to the repeat rule according to the supplemental recurrence data within the event update.

16. The computer program product of claim 13, wherein the computer-readable storage further comprises computer-usable program code that outputs an event update message comprising information indicating which occurrences of the recurring event are to be updated according to the supplemental recurrence data.

17. The computer program product of claim 13, wherein the computer-readable storage further comprises computer-usable program code that outputs an update response message comprising information confirming which occurrences of the recurring event have been updated in the PIM client according to the supplemental recurrence data.

* * * * *